Aug. 13, 1935.   R. J. ANDRIEU   2,010,974
DISPENSING APPARATUS FOR SPARKLING BEVERAGES
Filed Dec. 27, 1933   2 Sheets-Sheet 1
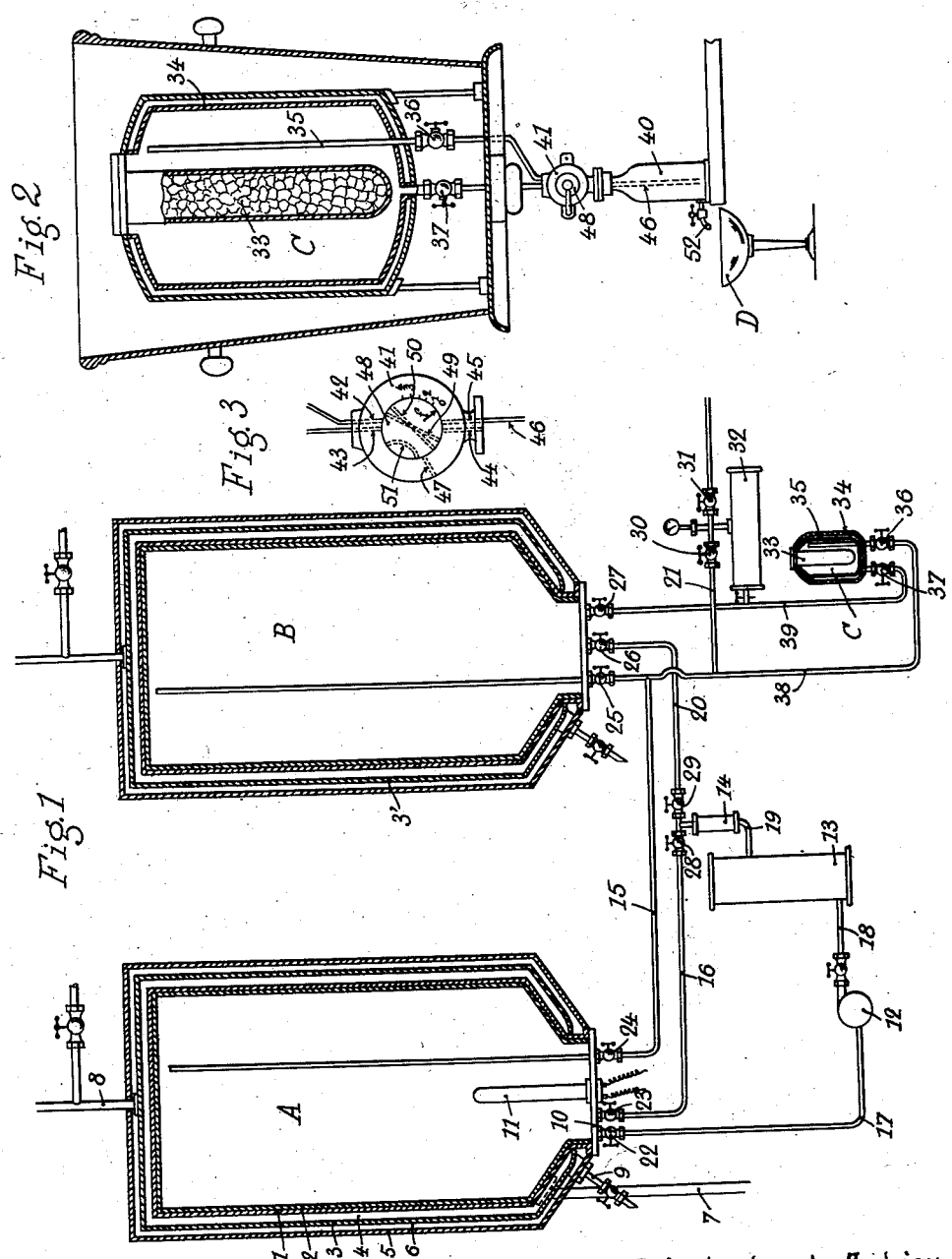
Robert Joseph Andrieu.
Inventor Aug. 13, 1935.  R. J. ANDRIEU  2,010,974
DISPENSING APPARATUS FOR SPARKLING BEVERAGES
Filed Dec. 27, 1933  2 Sheets-Sheet 2
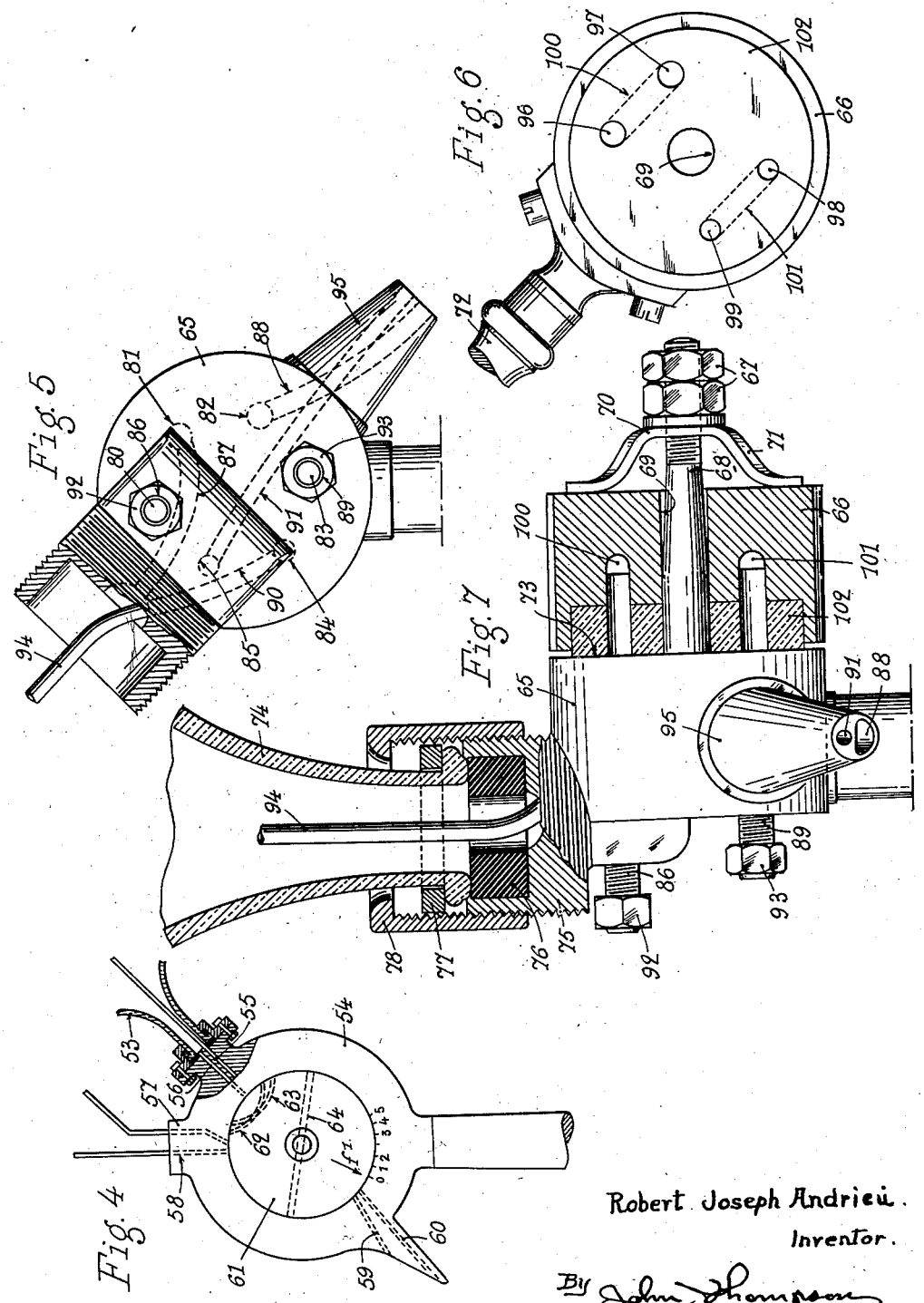
Robert Joseph Andrieu.
Inventor.
By John Thompson
Attorney.

Patented Aug. 13, 1935

2,010,974

UNITED STATES PATENT OFFICE 2,010,974

DISPENSING APPARATUS FOR SPARKLING BEVERAGES

Robert Joseph Andrieu, Epernay, France

Application December 27, 1933, Serial No. 704,062

5 Claims. (Cl. 225—21)

The present invention relates to the manufacture and the feeding of fermented sparkling or gaseous beverages such as champagne, beer, sparkling wines, etc.

The aim of the invention is to eliminate the bottling operation, which requires time as well as a considerable outlay for bottles, corks, labels, packing, etc., in plants engaged in the manufacture of such beverages, and which requires a long and laborious service in the establishments of consumption, owing to the greater or less difficulty and the care to be taken when uncorking the bottles.

The present invention has for its object a process and an apparatus by which the beverage is transferred, from the beginning of its manufacture until the time of its consumption, by the simple operating of corks.

The accompanying drawings show by way of example a form of realization of the object of the invention.

Fig. 1 represents diagrammatically, in elevational view, the entire installation in the manufacturing plant.

Fig. 2 represents, diagrammatically, the entire installation in the establishment of consumption.

Fig. 3 shows, on a larger scale, the cock having several directions, represented in Fig. 2.

Fig. 4 shows a modification of the cock having several directions.

Figs. 5 and 6 represent respectively the two main parts of another cock having several directions.

Fig. 7 shows this last mentioned cock partly in elevation and partly in section.

The wine, after it has been purified and filtered in the usual manner, has sugar and ferments added to it, and is delivered into a tightly closed fermentation vat A. In conformity to the invention, the quantity of sugar added to the juice or the beverage before it is delivered into the vat A, is sufficient in order that after the fermentation, the beverage will have the desired taste, on the one hand, and that on the other hand, the quantity of carbonic acid gas produced during the fermentation will raise the pressure in the fermentation vat to at least seven atmospheres at a temperature of 10° C., and preferably, even to a pressure of eight or nine atmospheres, instead of the pressure of four atmospheres commonly in use. Thus, in the manufacture of wine, for instance, instead of adding 20 grams of sugar per liter, as is done in other processes, there is added 35 grams of sugar per liter, in order to increase the formation of carbonic acid. There is further added according to the present invention, the quantity of sugar necessary to give to the wine the desired taste and to obtain the aforesaid pressure in the vat A. In addition to the 35 grams of sugar which are to be converted into alcohol and carbonic acid gas, there is added, for instance:

10 grams of sugar per liter for the taste "extra dry"

20 grams of sugar per liter for the taste "dry"

60 grams of sugar per liter for the taste "half-dry"

80 grams of sugar per liter for the taste "sweet"

In this manner, the addition of sugar is easier than when it is required to be done under pressure, after the fermentation.

The fermentation vat A consists of a metallic recipient 1 which is covered in the interior with a lining of bakelite 2. The said vat is mounted on legs 7 and is surrounded in the first place by a jacket 3 which forms around the recipient 1 a space 4 in which is circulated a refrigerating liquid, and then by a casing 5 in order to form an empty space 6 for protecting the vat against cold or heat. It is possible to admit or discharge cold water or cooling brine, through the conduits 8 and 9 into or from the space 4. The vat is closed by a cover 10 upon which is mounted an electric heating apparatus 11, preferably of silver-plated copper, entering the interior of the vat A. Owing to this arrangement, it is not necessary to displace the fermentation vat when it is required to renew the lining of bakelite which becomes deteriorated after a certain time, for instance three or four years. The renewing of the bakelite lining may be effected on the spot, as the electric heating apparatus permits to attain the temperature desired for the application of the bakelite (about 175° C), and the protecting casing has no risk of being deteriorated by the high temperature. It should be remarked that the temperature of 175° cannot be obtained by steam heating, and it has been hitherto necessary to send the vats to the special works for the manufacture of bakelite, when it is required to renew the lining 2.

When the 35 grams of sugar have been converted into alcohol and carbonic acid gas, the fermentation is stopped by pasteurizing under pressure by means of the electric heating apparatus 11. The heating destroys the ferments, and much improves the quality of the wine. After the pasteurizing, the wine or the beverage is cooled in the first place to a point between 15° and 20° C., by a circulation of cold water in the jacket 3, and then to 3 or 4 degrees below zero by means of a cooling brine which also circulates in the jacket 3. This cooling lasts for 5 to 6 days and it clarifies the wine. By this process, the wine or the beverage will remain in the same vat A from the day on which it is set in fermentation until the time at which it is filtered and bottled. This eliminates the difficult manipulations and the operations of decanting the sparkling beverage, and thus no gas or pressure is lost.

The sparkling wine or beverage is then filtered by circulating it by means of a pump 12 through a filter 13 and an inspection tube of glass 14, then delivering it into a storage vat B which resembles the vat A. A pipe 15 connects the upper part of the vat A with the upper part of the vat B, and the pipes 16, 17, 18, 19 and 20 make connection between the bottom parts of the vats A and B, the pump 12, the filter 13 and the pipe 14. A pipe 21 serves to supply the pipe 15 with air under pressure obtained from a source of compressed air, not shown. Cocks 22, 23, 24, 25, 26, 27, 28, 29, 30 and 31 are located on these different pipes. In order to filter the beverage, the operator first opens the cocks 25, 30 and 31 in order to fill the vat B with air at a pressure which is practically equal to that of the vat A. He then closes the cocks 30 and 31, and opens the cock 24, so that the upper parts of the vats A and B will be in communication, thus establishing the equilibrium of pressures.

He then opens the cocks 22, 23 and 28, and operates the pump 12. The beverage supplied from A passes through the pump 12, the filter 13 and the pipe 14, and then returns through the pipe 16 into the vat A. When the liquid passing through the pipe 15 is clear, he closes the cock 28 and opens the cocks 26 and 29. The beverage leaving the filter then returns to the vat B through the pipe 20.

It is possible to entirely eliminate the use of an outside source of compressed air, by adding a sufficient quantity of sugar before the fermentation, in order to obtain, after the fermentation, a sufficient quantity of carbonic acid gas in order that by simply opening the cocks 24 and 25, the vat A shall be filled with the beverage and the vat B filled with carbonic acid gas at a pressure of at least seven atmospheres. When the beverage has been transferred from the vat A to the vat B, the cocks 22, 24, 25 and 26 are closed.

The beverage is maintained in the cold state in the vat B by means of a circulation or cooling liquid in the jacket 3'.

The wine or beverage in the vat B can be bottled by means of an apparatus 32, known per se, which does not form part of the invention and which it is not necessary to describe. Such bottling requires the handling of a great number of bottles, and a certain outlay for corks, labels, and packing; on the other hand, at the place of consumption, the bottles must be uncorked with more or less difficulty, and this makes the service long and laborious, especially with a large clientele, as in cafes, bar-rooms, dancing establishments, etc. These various drawbacks are overcome by means of the system of distribution to be further described.

Instead of putting the wine or beverage in bottles, it is put in a small portable barrel C having the capacity of a certain number of bottles, for instance 12, 24 or a greater number of bottles. A pocket 33, which may contain ice or any cooling mixture, is introduced into the barrel in order to keep the beverage cool, and an insulating covering 34 aids in keeping the beverage at a constant temperature. A tube 35 which may be closed by a cock 36 rises to the upper part of the barrel, and a cock 37 permits to fill the barrel with liquid or to discharge it. The filling of the barrels is effected by connecting the cock 36 with the cock 25 by the pipe 38, and the cock 37 with the cock 27 by the pipe 39. The operator first opens the cocks 24, 25 and 36 in order that the carbonic acid gas under pressure may fill the barrel C. He then opens the cocks 27 and 37, so that the beverage will flow from B to C, and the carbonic acid gas in the barrel C returns to the vat B through the pipe 38 according as the recipient becomes filled with the beverage. It is thus observed that there is no loss of gas during the filling, and owing to the pressure of at least seven atmospheres prevailing in the vats A and B which remain in communication through the pipe 15, the beverage remains under a sufficient pressure, even until the time at which the vat B is entirely emptied. After closing the corks 24, 25, 27, 36 and 37, the barrel C may be sent to the place of consumption, in which the beverage is delivered into champagne glasses or ordinary glasses, by the simple operation of cocks, after the manner which is shown in Figs. 2 and 3.

An intermediate recipient 40 having approximately the capacity of a champagne glass or an ordinary glass or which may serve as a measure may communicate with the barrel C through a cock. The barrel 41 of this cock has two conduits 42 and 43 communicating respectively with the top of the recipient 40, and through the tube 46 with the bottom of the recipient 40, and a conduit 47 opening into the atmosphere. The plug 48 of the cock has three conduits which do not communicate with one another, 49, 50 and 51. An arrow f located on the plug may be brought, by turning the plug, opposite the graduations 0, 1, 2, 3, 4 marked on the barrel. The figure represents the device in the position 0, in which the barrel C and the recipient 40 have no communication with one another, and thus the carbonic acid gas under pressure will escape into the atmosphere. It is then simply necessary to open the cock 52 in order that the wine may flow without pressure into the glass D. It will thus be remarked that by means of the process according to the invention, there is eliminated a bottling operation which requires time and a considerable outlay for bottles, corks, labels, packing, etc., and it is only required to transfer the beverage by the simple operating of cocks, from the beginning of the fermentation, to the delivery into the drinking glasses.

The cocks 48 and 52 shown in Figs. 2 and 3 may be replaced by a single cock, as represented in Fig. 4. In this case, the intermediate recipient 53 is mounted in the inverted and inclined position upon the barrel 54 of the cock which has the conduits 55, 56, 57, 58 communicating respectively with the bottom and with the neck of the recipient 53, and with the cocks 36 and 37 of the barrel C, as well as the conduits 59 and 60 opening into the atmosphere. The plug 61 of this cock has conduits 62, 63, 64 which do not communicate with one another. When the arrow $f^1$ of the plug 61 is brought successively opposite the marks 0, 1, 2, 3, 4 of the barrel, this will afford the same operations as for the corresponding positions of the plug 48 of the device shown in Figs. 2 and 3. When the arrow $f^1$ is brought opposite the mark 5, the wine will flow from the recipient 53 into the glass D through the conduits

56, 64, 60. One may, if necessary, omit the position 1 during the operation, and proceed directly from 0 to 2. In this case, the carbonic acid gas and the wine will simultaneously enter the recipient 53 but as the gas is more fluid, it will enter in the first place in greater quantity, and will then be returned to the barrel C as fast as the liquid enters.

Figs. 5, 6 and 7 represent another type of cock which may replace the cock 54—61 shown in Fig. 4, and it assures perfect and durable fluid-tight conditions. The said cock comprises two cylindrical members 65 and 66 which may be pressed together by nuts 67 screwed upon a rod 68 which forms part of the member 65 and which extends loosely through a hole 69 in the member 66. The said nuts press against a washer 70 whose elastic arms 71 are in contact with the member 66. A handle 72 serves to turn the member 66 upon the rod 68. An intermediate recipient 74 may be mounted on the threaded connecting end 75 of the member 65 by the use of a rubber packing piece 76, a washer 77 and a cap with internal thread 78. On the face 73 of the member 65 are the mouths 80, 81, 82, 83, 84 and 85 of respective conduits 86, 87, 88, 89, 90 and 91 formed in the member 65. Connecting pieces 92 and 93 located at the inner ends of the respective conduits 86 and 89 serve to connect these conduits respectively with the cocks 37 (beverage) and 36 (carbonic acid gas) of the barrel C. The conduit 87 communicates with the neck of the intermediate recipient 74 and the conduit 90 communicates with the upper part of said recipient 74 by means of the tube 94. The conduits 88 and 89 both lead to the discharge spout 95 forming part of the member 65.

Into the member 66 is sealed a glass plate which is well dressed off, 102, and is adapted to be fitted against the face 73 of the member 65 in order to assure a tight joint. In the glass plate 102 and in the member 66 are formed four holes, not bored through, 96, 97, 98 and 99, which are connected together in pairs by conduits 100 and 101.

In the relative positions shown in Figs. 5 and 6, the holes 96, 97, 98 and 99 are opposite imperforate parts of the face 73 of the member 65. If the member 66 is turned in the counter-clockwise direction (Fig. 6), this will cause a coincidence, on the one hand, between the orifices 83 and 84 and the holes 98 and 99, and thus the carbonic acid gas in the barrel C will enter the intermediate recipient 73 through 36, 89, 98, 101, 99, 90, 94, and on the other hand, between the orifices 80 and 81 and the holes 96 and 97, so that the beverage in the barrel C will enter the recipient 74 through 37, 89, 96, 100, 97, 87. At the start, the carbonic acid gas, which is more fluid, will begin to fill the recipient 74, and it is again driven into the barrel according as the beverage enters. If on the contrary the member 66 is turned in the clockwise direction (Fig. 6), this will cause a coincidence, on the one hand between the orifices 84 and 85 and the holes 98 and 99, and thus the carbonic acid gas in the recipient 74 will issue through 94, 90, 98, 101, 99, 91, and on the other hand, between the orifices 81 and 82 and the holes 96 and 91, so that the wine will flow from the recipient 74 through 87, 96, 100, 97, 88 and through the spout 95, and it is thus received in the champagne glass or the ordinary glass.

It will be remarked that the process and the apparatus as above disclosed will thus greatly simplify the preparation and the feeding of sparkling beverages. Owing to the super-saturation of the beverage with carbonic acid gas, to the cooling devices employed, and to the minimum loss of carbonic acid gas during the successive transfers, the sparkling beverage will always remain under pressure from the end of the fermentation until it is delivered into drinking glasses, and thus it preserves its carbonic acid gas and remains in the sparkling state until the last glass is consumed.

It is evident that numerous modifications may be made in the process and in the apparatus hereinabove described by way of example, without departing from the spirit of the invention.

Having now described my invention what I claim as new and desire to secure by Letters Patent is:

1. An apparatus for the feeding of fermented sparkling beverages, comprising a feeding recipient adapted to contain the beverage and carbonic acid gas under pressure, an intermediate recipient, means connecting the upper part of said intermediate recipient with the upper part of the feeding recipient, thereby supplying carbonic acid gas from the feeding recipient to the intermediate recipient, means connecting at the same time the bottom of the intermediate recipient with the bottom of the feeding recipient, and the top of the intermediate recipient with the top of the feeding recipient, thereby supplying the beverage from the feeding recipient to the intermediate recipient and returning the carbonic acid gas from the intermediate recipient to the feeding recipient, means connecting the top of the intermediate recipient with the atmosphere, thereby evacuating the carbonic acid gas under pressure, and means provided on the intermediate recipient for the discharge of the beverage.

2. An apparatus for the feeding of fermented sparkling beverages as claimed in claim 1, in which a pocket adapted to contain a cooling agent is mounted in the interior of the feeding recipient.

3. An apparatus for the feeding of fermented sparkling beverages as claimed in claim 1, in which a pocket adapted to contain a cooling agent is mounted in the interior of the feeding recipient, and an outer insulating casing surrounds the said feeding recipient.

4. An apparatus for the feeding of fermented sparkling beverages, comprising a feeding recipient adapted to contain the beverage and carbonic acid gas under pressure, an intermediate recipient and a cock comprising a fixed part and a movable part, the fixed part being pierced with four conduits communicating respectively with the bottom of the feeding recipient, with the top of the feeding recipient, with the bottom of the intermediate recipient and with the top of the intermediate recipient, and pierced with two conduits communicating with the atmosphere and adapted respectively to discharge the carbonic acid gas and the beverage to the outside, the movable part comprising conduits adapted to successively connect, by means of the conduits of the said fixed part, the top of the intermediate recipient with the top of the feeding recipient, the bottom of the intermediate recipient with the bottom of the feeding recipient, the top of the intermediate recipient with the atmosphere, and the bottom of the intermediate recipient with the amosphere.

5. An apparatus for the feeding of fermented sparkling beverages, comprising a feeding recipient adapted to contain the beverage and carbonic acid gas under pressure, an intermediate recipient, a cock consisting of two metallic members in contact with one another upon a flat surface, one of the said members being provided, adjacent the said flat surface, with a glass plate making contact with the other metallic piece, means for turning one of the said members upon the other about an axis which is perpendicular to the said flat surface, elastic means for pressing the said members together, one member being provided with four conduits opening upon the flat surface and communicating respectively with the top of the feeding recipient, with the bottom of the feeding recipient, with the top of the intermediate recipient and with the bottom of the intermediate recipient, and with two conduits also opening upon the flat surface and communicating at the other end with the atmosphere, said conduits being adapted for the respective discharge, to the outside, of the carbonic acid and of the beverage, the second member being provided with two conduits opening at both ends upon the said flat surface, and so arranged that for a certain relative position of the two members, the top of the feeding recipient will communicate with the top of the intermediate recipient, and the bottom of the feeding recipient will communicate with the bottom of the intermediate recipient, and that for another relative position of the two members, the top and the bottom of the intermediate recipient will communicate with the atmosphere.

ROBERT JOSEPH ANDRIEU.